(12) United States Patent
He et al.

(10) Patent No.: US 8,601,483 B2
(45) Date of Patent: Dec. 3, 2013

(54) FORECASTING BASED SERVICE FOR VIRTUAL MACHINE REASSIGNMENT IN COMPUTING ENVIRONMENT

(75) Inventors: Ting He, Piermont, NY (US);
Kang-won Lee, Nanuet, NY (US);
Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/069,030

(22) Filed: Mar. 22, 2011

(65) Prior Publication Data

US 2012/0246638 A1   Sep. 27, 2012

(51) Int. Cl.
*G06F 9/46*   (2006.01)
*G06F 9/455*   (2006.01)

(52) U.S. Cl.
USPC .......................................... 718/104; 718/105

(58) Field of Classification Search
None
See application file for complete search history.

(56) References Cited

U.S. PATENT DOCUMENTS

| | | | |
|---|---|---|---|
| 6,125,105 A | 9/2000 | Edwards et al. | |
| 6,937,966 B1 | 8/2005 | Hellerstein et al. | |
| 7,289,527 B2 | 10/2007 | Ghosal et al. | |
| 7,594,229 B2 | 9/2009 | Hirschsohn | |
| 8,224,885 B1 * | 7/2012 | Doucette et al. | 709/201 |
| 2007/0204266 A1 * | 8/2007 | Beaty et al. | 718/1 |
| 2008/0295096 A1 * | 11/2008 | Beaty et al. | 718/1 |
| 2009/0204718 A1 | 8/2009 | Lawton et al. | |
| 2010/0115174 A1 | 5/2010 | Akyol et al. | |
| 2010/0154045 A1 | 6/2010 | Pairault et al. | |
| 2012/0089726 A1 * | 4/2012 | Doddavula | 709/224 |
| 2012/0311012 A1 * | 12/2012 | Mazhar et al. | 709/201 |

OTHER PUBLICATIONS

Anwer, et al., "Network I/O Fairness in Virtual Machines"; GOOGLE; Sep. 2010; pp. 1-8.
Blade Network Technologies, "Virtual Machine-Aware Networking", GOOGLE; Nov. 2009; pp. 1-9.
Chowdhury, et al., "Virtual Network Embedding with Coordinated Node and Link Mapping", Proceedings of IEEE INFOCOM 2009; pp. 1-9.
Furlani, "Cloud Computing: Benefits and Risks of Moving Federal IT Into the Cloud", GOOGLE; Jul. 2010; pp. 1-11.
Hou, et al. "On the Mapping Between Logical and Physical Topologies", INSPEC/IEEE; 2009; pp. 1-19.
Iqbal, et al., "SLA-Driven Adaptive Resource Management for Web Applications on a Heterogeneous Compute Cloud", INSPEC/Springer Verlag; 2009; pp. 1-11.
Krauter, et al., "A Taxonomy and Survey of Grid Resource Management Systems for Distributed Computing", copyright 2001 John Wiley & Sons, Ltd., pp. 135-164.

(Continued)

*Primary Examiner* — Meng An
*Assistant Examiner* — Bradley Teets
(74) *Attorney, Agent, or Firm* — Cantor Colburn LLP; Preston Young

(57) ABSTRACT

A mechanism is provided for reassigning virtual machines to resources in a computing environment. Monitoring data is collected about virtual machine request history and resource usage in a form of time series for measured indicators. Forecasted time series are computed for the measured indicators over a time window by utilizing time series forecasting. A new assignment is computed by executing a snapshot based assignment algorithm on the forecasted time series. The new assignment is used for reassignment of virtual machines on the resources in the computing environment.

12 Claims, 7 Drawing Sheets

(56) References Cited

OTHER PUBLICATIONS

Mell, et al., "The NIST Definition of Cloud Computing (Draft)", recommendations of the National Institute of Standards and Technology; Jan. 2011; pp. 1-7.

Meng, et al., "Efficient Resource Provisioning in Compute Clouds via VM Multiplexing", ICAC '10, Jun. 7-11, 2010, Washington, DC, USA.; pp. 1-10.

Samadani, et al., "Prediction Based Task Scheduling in Distributed Computing", PODC 95 Ottwa Ontario CA 1995; pp. 261.

Yang, et al., "Conservative Scheduling: Using Predicted Variance to Improve Scheduling Decisions in Dynamic Environments", Supercomputing '03, Nov. 15-21, 2003, Phoenix, Arizona, USA, pp. 1-16.

Zhu, et al., "Algorithms for Assigning Substrate Network Resources to Virtual Network Components", Proceedings of IEEE INFOCOM 2006; pp. 1-12.

* cited by examiner

FORECASTING BASED SERVICE FOR VIRTUAL MACHINE REASSIGNMENT IN COMPUTING ENVIRONMENT

This invention was made with Government support under Contract No.: 60NANB10D003 awarded by National Institute of Standards and Technology (NIST). The Government has certain rights in this invention.

BACKGROUND

Exemplary embodiments relate to resource management, and more specifically, forecasting-based service assignments in cloud computing environments.

Utility/cloud computing delivers compute and storage resources to applications as an 'on-demand utility', similar to an electricity grid. The utility computing model is enabled by distributed collection of compute and storage resources spread over a local or a wide area network, i.e., networked utilities. Examples include scientific workflows running on computational grids and multi-tier web services (e.g., an ecommerce website) operating in data centers. The utility setting offers several benefits for applications: reduced infrastructure and management costs, higher resource utilization, and the ability to allocate resources on-demand to support dynamically changing demands, which results in reduced capital expenditure costs.

Virtual machine (VM) technology offers powerful mechanisms for efficient management of networked utilities. After a decade of advances in VMs, robust and efficient VM systems are widely available and are fast becoming ubiquitous. The leading VM systems support live migration, checkpoint/restart, and fine-grained allocation of server resources as a measured and metered quantity. These capabilities create a rich decision space for utility resource management such as how an intelligent infrastructure should "turn the knobs" to map workload and resource requests onto a server network.

Intelligent provisioning of VMs is necessary to meet system performance goals such as meeting application Service Level Agreements (SLAs), optimizing application execution time, and maximizing overall resource usage. However, provisioning VMs to meet such goals may be considered involved because application behavior is dictated by the interaction of several factors such as: Resources: The number of VMs assigned to the application, and the properties of the underlying resources bound to each VM, e.g., CPU, memory, storage, and network resources. Data: The characteristics of the data that the application processes such as the input data size, and its layout and partitioning on the storage server. Workload: The characteristics of the workload seen by the application, e.g., the request arrival rate, and the service demand of each request.

BRIEF SUMMARY

According to exemplary embodiments, a method on a computer for reassigning virtual machines to resources in a computing environment is provided. Monitoring data is collected about virtual machine request history and resource usage in a form of time series for measured indicators. Forecasted time series are computed for the measured indicators over a time window by utilizing time series forecasting. A new assignment is computed by executing a snapshot based assignment algorithm on the forecasted time series. The new assignment is utilized for reassignment of virtual machines on the resources in the computing environment.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Figure 1:
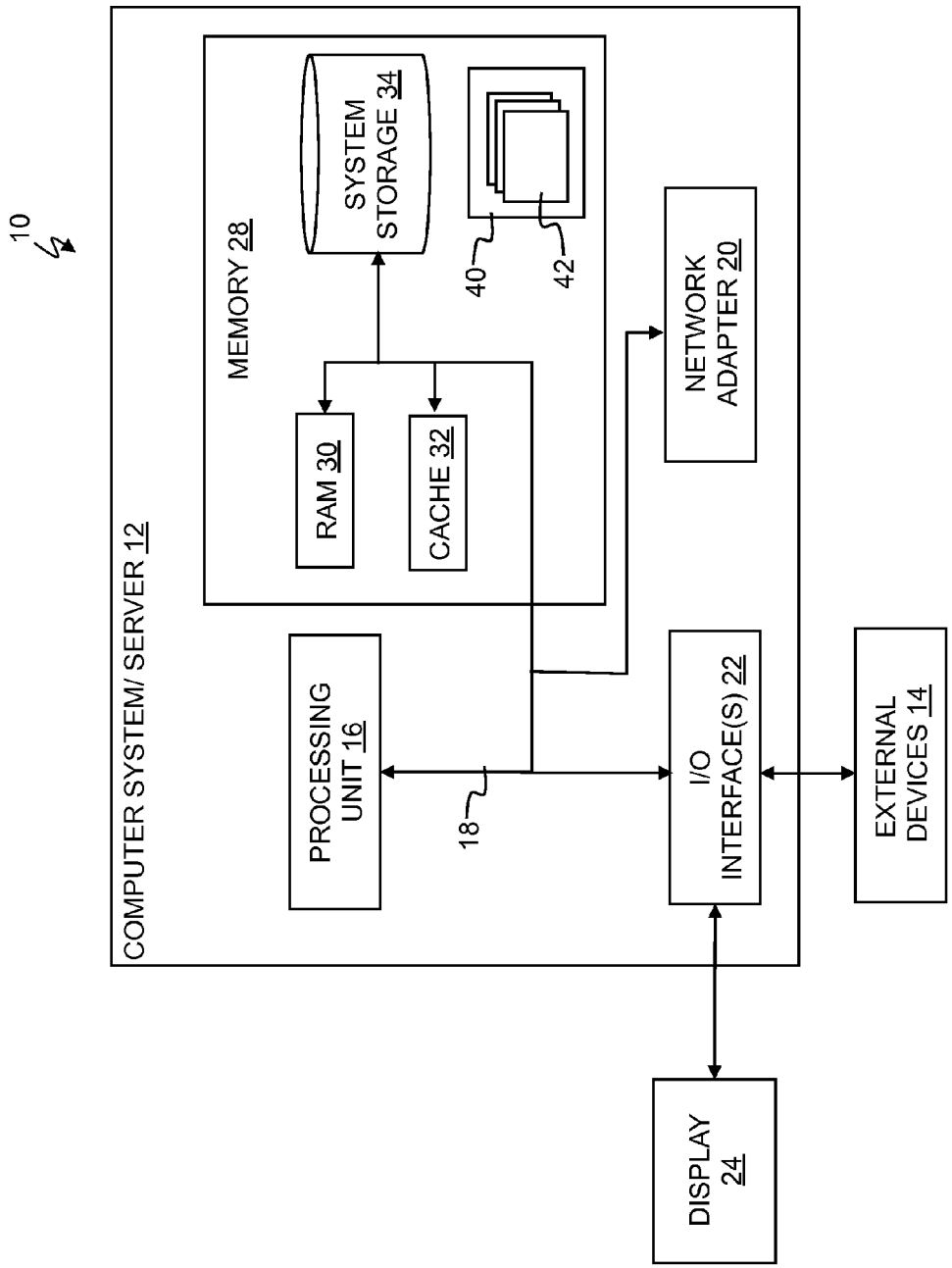
FIG. 1 illustrates a schematic of an example of a cloud computing node in accordance with exemplary embodiments.

Exemplary embodiments are configured to assign service demands/requests to physical computation resources in a cloud computing environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Further information regarding cloud computing may be found in the "Draft NIST Working Definition of Cloud Computing" by Peter Mell and Tim Grance, 7 Oct. 2009, which is herein incorporated by reference in its entirety.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, FIG. 1 illustrates a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
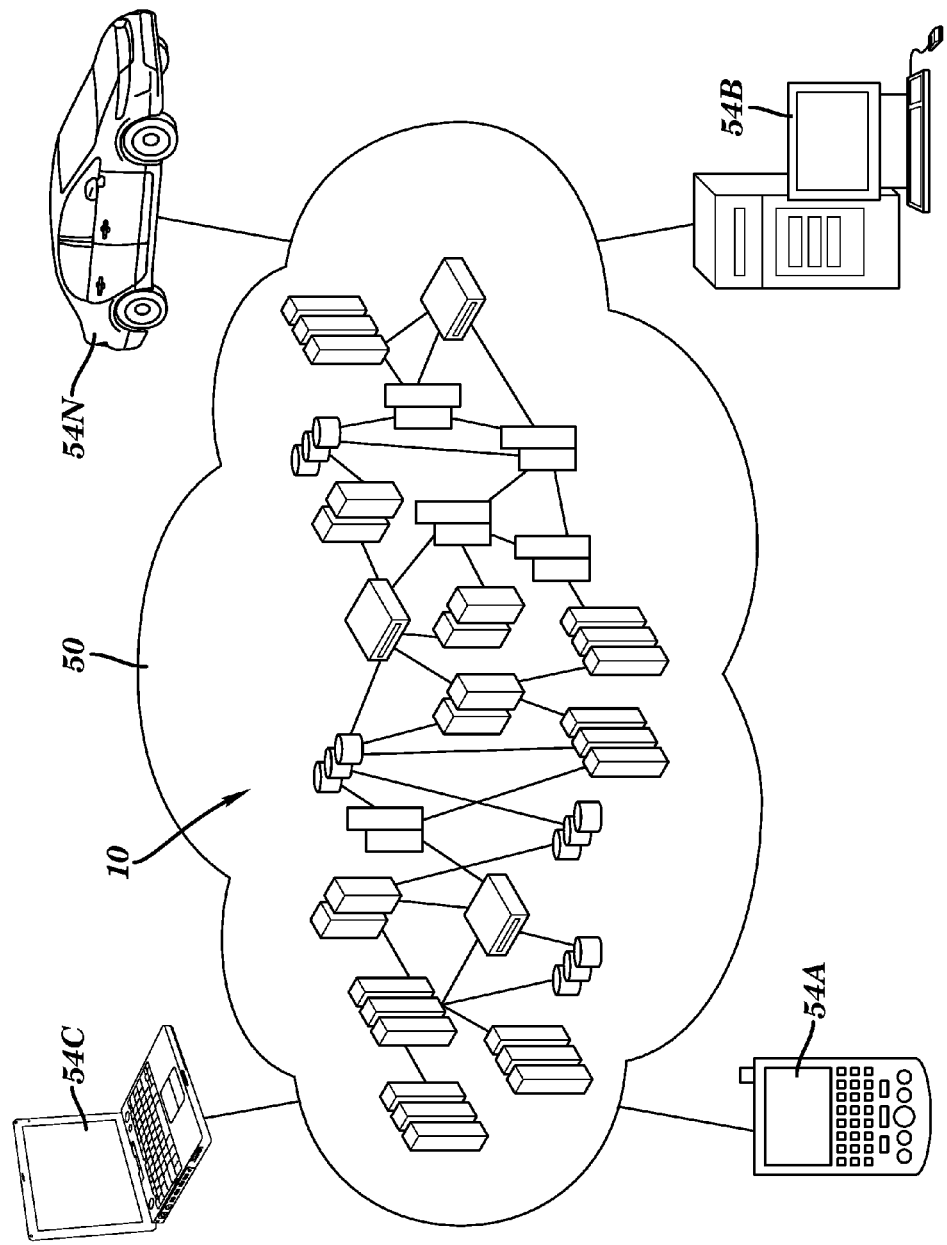
FIG. 2 illustrates a cloud computing environment in accordance with exemplary embodiments.

Referring now to FIG. 2, FIG. 2 illustrates a cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
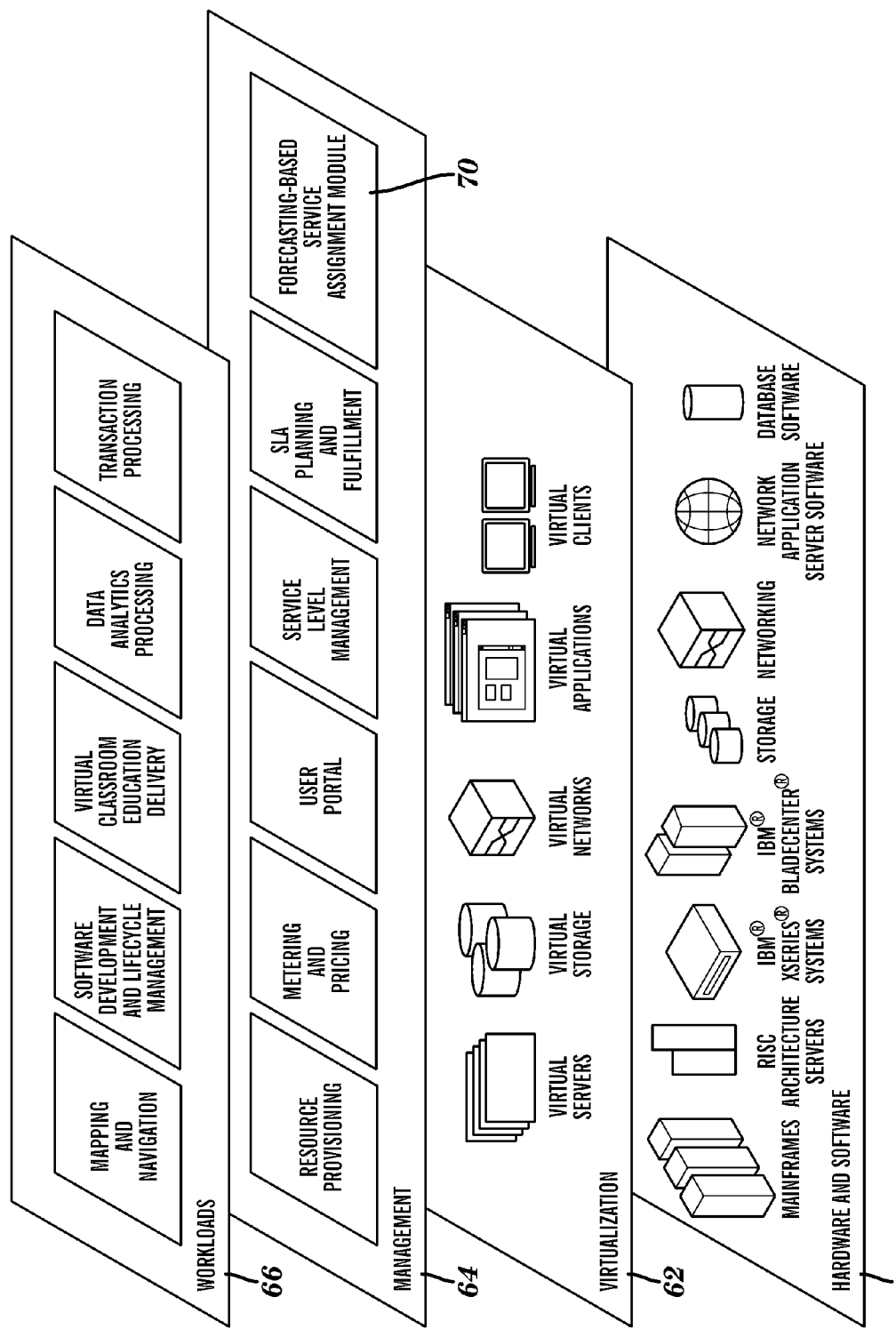
FIG. 3 illustrates a set of functional abstraction layers provided by a cloud computing environment in accordance with exemplary embodiments.

Referring now to FIG. 3, FIG. 3 illustrates a set of functional abstraction layers provided by cloud computing environment 50 (shown in FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer 64 also includes a forecasting-based service assignment module.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. Further, other types of workloads may also include web service workloads, enterprise applications such as billing and customer relationship management, various banking and finance applications, etc.

The forecasting-based service assignment module 70 comprises one or more algorithms to implement exemplary embodiments. The forecasting-based service assignment module 70 may be coupled to and/or reside in the memory 28. The forecasting-based service assignment module 70 may comprises one or more program modules 42 of the program/utility 40. Also, the forecasting-based service assignment module 70 may be part of the management layer 64 and may be run on hardware in the hardware and software layer 60. The forecasting-based service assignment module 70 may include and/or implement the functionality of a scheduler.

In accordance with exemplary embodiments, the forecasting-based service assignment module 70 views each workload and/or resource metric as a time series rather than a single value to take into account their temporal variation. The forecasting-based service assignment module 70 may leverage/incorporate any existing solutions of time-series forecasting (algorithms) and snapshot-based service assignment (algorithms). A snapshot provides the current service demands (for virtual machines) and the current servers presently being used to those demands, all of which is at a single instance in time. A snapshot based assignment is a reassignment of the current virtual machines (as the service demand) presently mapped on the current servers.

Exemplary embodiments (e.g., via the forecasting-based service assignment module 70) develop service assignment approaches that (explicitly) take the temporal changes in demand and/or resources into account, and therefore achieve better performance in the cloud computing environment 50. An implementation of exemplary embodiments is to expand (via the forecasting-based service assignment module 70) the horizon of the service assignment algorithm from a single point of time to a time window over the near future and to utilize existing monitoring and forecasting capabilities (e.g., in the management layer 64 and/or the workloads layer 66) in the cloud computing environment 50 to design assignments that are likely to be satisfied over the forecasting window. Compared with existing contexts where forecasting has been successfully applied, the issue with applying forecasting to service assignment in cloud computing imposes new challenges because demands and resources in cloud vary rapidly and randomly, human intervention is highly limited, and reassignment incurs nontrivial cost and should be judiciously controlled.

Exemplary embodiments provide a systematic way of handling these issues. Another implementation of exemplary embodiments is (for the forecasting-based service assignment module 70) to use such forecasting to trigger reassignments (of virtual machines) before severe quality of service (QoS) degradation occurs. Compared with existing solutions of snapshot-based assignment, the exemplary embodiments can strategically plan the assignments based on the trends of resource utilization in the cloud and therefore provide better performance.

Figure 4:
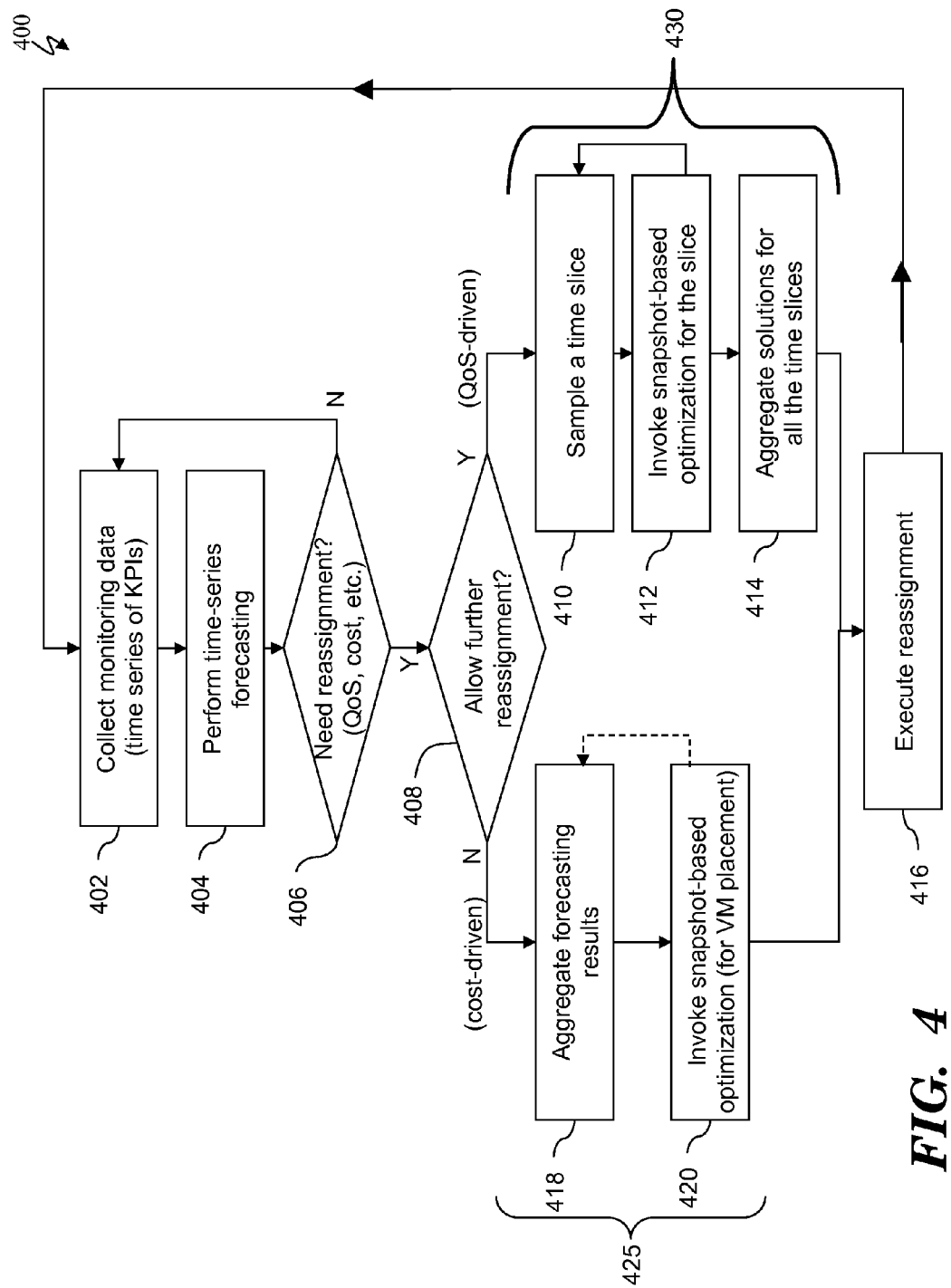
FIG. 4 illustrates a flow chart in accordance with exemplary embodiments.

FIG. 4 illustrates a process 400 of the forecasting-based service assignment module 70 according to exemplary embodiments. For explanation purposes and ease of understanding, a service workload may be a virtual machine (VM), and an assignment refers to assigning a virtual machine (i.e., service workload) to an available resource such as the computer system/server 12. Reassignment refers to assigning (mapping) an existing virtual machine(s) on one computer system/server 12 to a different computer system/server 12.

At operation 402, the forecasting-based service assignment module 70 is configured to collect monitoring data about the service workloads and the available resources over a period of time. The size of this period is determined by the forecasting technique used and may be varied as desired. The monitoring data such as key performance indicators (KPIs) may be stored in or collected from the storage system 34. Also, the monitoring data may be collected from the management layer 64.

At operation 404, the forecasting-based service assignment module 70 is configured to feed each series of the collected data into a forecasting technique/algorithm (which may be implemented by the forecasting-based service assignment module 70) to obtain a corresponding predicted/forecasted time series over a time window (T) of given size. The size of this time window is a design parameter and can be tuned to fit the desired frequency of reassignment and/or the desired forecasting accuracy. This time window is a particular time interval in the future, which may be minutes, hours, days, weeks, months, etc.

At operation 406, the forecasting-based service assignment module 70 is configured to determine whether a reassignment of a virtual machine(s) is needed. The forecasting-based service assignment module 70 is configured to take into account whether the current assignment of the virtual machine (on a particular computer system/server 12) is able to meet the quality of service (required in the future) for the virtual machine, cost, etc., during the time window (T). As discussed herein the cost of reassignment, such as virtual machine migration, includes the consumed bandwidth and the lost/required computation time to move the virtual image and virtual data, along with the cost of service interruption. If no reassignment is need (e.g., to meet the quality of service in the future time window (T)), the flow returns to operation 402. If a reassignment is needed (e.g., to meet the quality of service that would be needed during the time window and/or to prevent multiple reassignments of virtual machines in the future time window), the flow progresses to operation 408. For example, the forecasting-based service assignment module 70 may be configured to conduct a test of the performance of the existing current assignment under the forecasted (i.e., future/predicted) workloads and forecasted resources, and then proceed operations 408 if the test indicates that reassignment is needed. In practice, this testing operation can be used to avoid unnecessary reassignments as well as to trigger new reassignments when needed. For example, the test by forecasting-based service assignment module 70 can detect likely service disruptions in the near future and trigger reassignments to avoid such disruptions beforehand. Also, the forecasting-based service assignment module 70 may be configured to determine that X amount of reassignment(s) of virtual machines now is more cost effective (i.e., efficient) than Y amount of reassignments in the future during the time window (T), where X<Y. For example, the forecasting-based service assignment module 70 may determine that performing 2 virtual machine reassignments at present (time) when the demand, requests, and/or workloads are lighter is more cost effective than requiring 20 virtual machine reassignments in the future during the time window (T).

Operation 408 begins the realization of two approaches according to exemplary embodiments. For explanation purposes and not limitation, the first approach 425 may be considered as time series aggregation (cost driven), and the second approach 430 may be considered as service assignment aggregation (QoS driven).

At operation 408, the forecasting-based service assignment module 70 is configured to determine if a further reassignment should be allowed. If no, the flow proceeds to the time series aggregation approach 425. If yes, the flow proceeds to the service assignment aggregation approach 430.

At operations 425 and/or 430, the forecasting-based service assignment module 70 is configured to compute a new assignment for one or more virtual machines, which is a reassignment for the virtual machine(s) that are currently assigned and operating on particular computer systems/servers 12, based on the predicted/forecasted time series and a given snapshot based assignment algorithm that achieves balanced performance over the entire forecasting time window.

At operation 416, the forecasting-based service assignment module 70 is configured to execute the new assignment by remapping the services (i.e., virtual machines) that are inconsistent in the existing assignment of virtual machines.

The above procedure of the forecasting-based service assignment module 70 can be invoked repeatedly to achieve adaptive service (re)assignment of virtual machines over time. Note that an assignment refers to reassigning one or more virtual machines from one computing system/server 12 to a different computer system/server 12. According to exemplary embodiments, reassigning a virtual machine in the present can prevent multiple reassignments of multiple virtual machines in the future time window T, in which reassignment in the future will have a higher reassignment cost to meet future demand.

Now, turning to the time series aggregation approach 425, at operation 418, the forecasting-based service assignment module 70 is configured to compress (aggregate) each predicted/forecasted time series into a single value that is of the same size (dimensionality) as individual elements of the time series by a certain aggregation function. The aggregation function may be implemented in the forecasting-based service assignment module 70, and examples of the aggregation function may include max/min, percentile, mode, interquartile mean, arithmetic mean, and median. Forecasted time series are compressed into single values so as to be used by service (re)assignment (snapshot) algorithms that operate using a single value for each KPI that they consider. With reference to FIG. 4 and a diagram 700 in FIG. 7, the forecasting-based service assignment module 70 can execute an example aggregation function 702 to aggregate a predicted/forecasted time series 704a through predicted/forecasted time series 704n. The forecasting-based service assignment module 70 can determine a single value x for each KPI based on the predicted/forecasted time series 704a-704n. For example, the forecasting-based service assignment module 70 can implement mean as an aggregation function, which guarantees (within forecasting accuracy) a feasible assignment on the aggregated KPIs will provide sufficient resources to the virtual machines on the average in the forecasting window (T); alternatively, the forecasting-based service assignment module 70 can implement p-percentile as an aggregation function for virtual machine demands (and (1−p)-percentile for resources), which guarantees (again within forecasting accuracy) a feasible assignment on the aggregated KPIs will remain feasible at least p fraction of the time during the forecasting window (T). In general, the aggregation function may include but is not limited to any measure used in summary statistics such as location and percentiles, or even have some other generic form.

At operation 420, the forecasting-based service assignment module 70 is configured to use the aggregated single values x as the input of the given snapshot based assignment algorithm to obtain a new assignment (i.e., reassignment) for the virtual machine. In one example snapshot based assignment (algorithm) module 706 may be integrated with and/or coupled to the forecasting-based service assignment module 70 to obtain a reassignment for the entire set of aggregated forecasted KPI values, one for each individual predicted/forecasted time series 704a-704n. The time series aggregation approach 425 is to compress the time-varying workloads (virtual machines) and resources (different computer systems/servers 12) per predicted/forecasted time series 704a-704n into a representative snapshot for the entire forecasting window. The selection of a desired aggregation function such as the example aggregation function 702 depends on the performance requirement of the computing environment 50. For example, a maximum amount of workloads (virtual machines for reassignment) and minimum amount of resources (computer systems/servers 12 to map/reassign the virtual machines to) will guarantee that the computed new assignment will remain feasible throughout the forecasting time window but may underutilize the resources (the computer systems/servers 12 in the computing environment 50), i.e., overestimating workloads and/or underestimating available resources. Another option is to use a percentile (p) of workloads and a complementary percentile (1−p) of resources (where 0<p<1) which may give better resource utilization but may not guarantee feasibility all the time in the forecasting time window (only p fraction of the time). Other types of aggregation functions are also possible.

Turning to the service assignment aggregation approach 430, at operation 410 the forecasting-based service assignment module 70 is configured to discretize the predicted/forecasted time series into a few time slices through sampling. For example, in FIG. 7, the graph of the predicted/forecasted time series 704a is sampled into time slices $X_a(t_0)$, $X_a(t_1) \ldots X_a(t_n)$.

At operation 412, the forecasting-based service assignment module 70 is configured to execute the given snapshot-based assignment algorithm to compute an assignment for each time slice X(t), which is a snapshot of the KPI values $X(t)=\{X_a(t), X_b(t) \ldots X_n(t)\}$ at time instance t, where $t=t_0$, $t_1, \ldots t_n$ in the forecasting time window. The forecasting-based service assignment module 70 executes the snapshot-based assignment algorithm (e.g., snapshot-based assignment algorithm 706) for KPIs specified in each time slice, i.e., predicted/forecasted values for time series 704a through time series 704n at a sampled time instance $(t_0, t_1, \ldots t_a)$, which produces per time slice assignments $A(t_i)$, where i=0, 1, ... n.

At operation 414, the forecasting-based service assignment module 70 is configured to aggregate these per time slice assignments $A(t_i)$ into a single assignment for the entire forecasting time window (T). The forecasting-based service assignment module 70 aggregates the time slice assignments $A(t_i)$ for all the sampled time slices, such that a single assignment applicable to all time slices is generated. For example, if there were 3 time slices, then the forecasting-based service assignment module 70 would generate 3 individual assignments with each corresponding to one time slice. The aggregation by the forecasting-based service assignment module 70 of per time slice assignments $A(t_i)$ into a single assignment is performed by finding an assignment solution that has the minimum cost (e.g., the minimum number of reassigned services (virtual machines) and/or minimum sum weights of reassigned services) of being changed into each one of the per-slice assignments $A(t_i)$. Additionally, in the service assignment aggregation approach 430, the forecasting-based service assignment module 70 may find an intermediate assignment solution that is close to the instantaneously optimal assignments $A(t_i)$ at the reference points (which are the time instances $t_0, \ldots, t_n$ for the generated time slices) in the forecasting window (T). For example, in one realization of the time slices, the assignment $A(t_0)$ (corresponding to the time slice at $t_0$) is to place the virtual machine on server 6 and the assignment $A(t_1)$ (corresponding to the time slice at $t_1$) is to place it on server 10; instead of selecting the aggregated assignment as either $A(t_0)$ for server 6 or $A(t_1)$ for server 10, the forecasting-based service assignment module 70 may be configured to select an intermediate server 8 for the virtual machine. Suppose server 6 has more available resources, e.g., memory, CPUs, and processor speed, than server 10 at time $t_0$ and the reverse is true at time $t_1$; accordingly, the forecasting-based service assignment module 70 may be configured to determine/select the intermediate server 8 which has more available memory, CPUs, processor speed, etc., than the less of server 6 and server 10 for both of the time instances to host the reassigned virtual machine. In addition/alternatively, the forecasting-based service assignment module 70 may select server 8 because it has shorter distances (e.g., high bandwidth/low delay connections) to both server 6 and server 10, so that it will be easier to migrate the virtual machine to one of these latter servers (server 6 and/or 10) in future run time if needed. The forecasting-based service assignment module 70 may be configured to find an intermediate assignment in the above sense among a general number of per time slice assignments (including between any two assignment at times $t_0$ and $t_1$ and/or between any two averaged groups of assignments $t_i$).

To sample time slices under the service assignment aggregation approach 430, the forecasting-based service assignment module 70 is configured to sample time slices by using a periodic technique, an adaptive technique, and/or any other suitable technique. In the periodic technique, time slices are evenly sampled from the forecasting window T (which can be any period of time, such as minutes, hours, days, weeks, etc.) at a specified interval corresponding to the frequency of the intermediate assignment check during the forecasting window T. Particularly, the forecasting-based service assignment module 70 is configured to focus attention on the time instances when assignment adjustments are possible.

Figure 5:
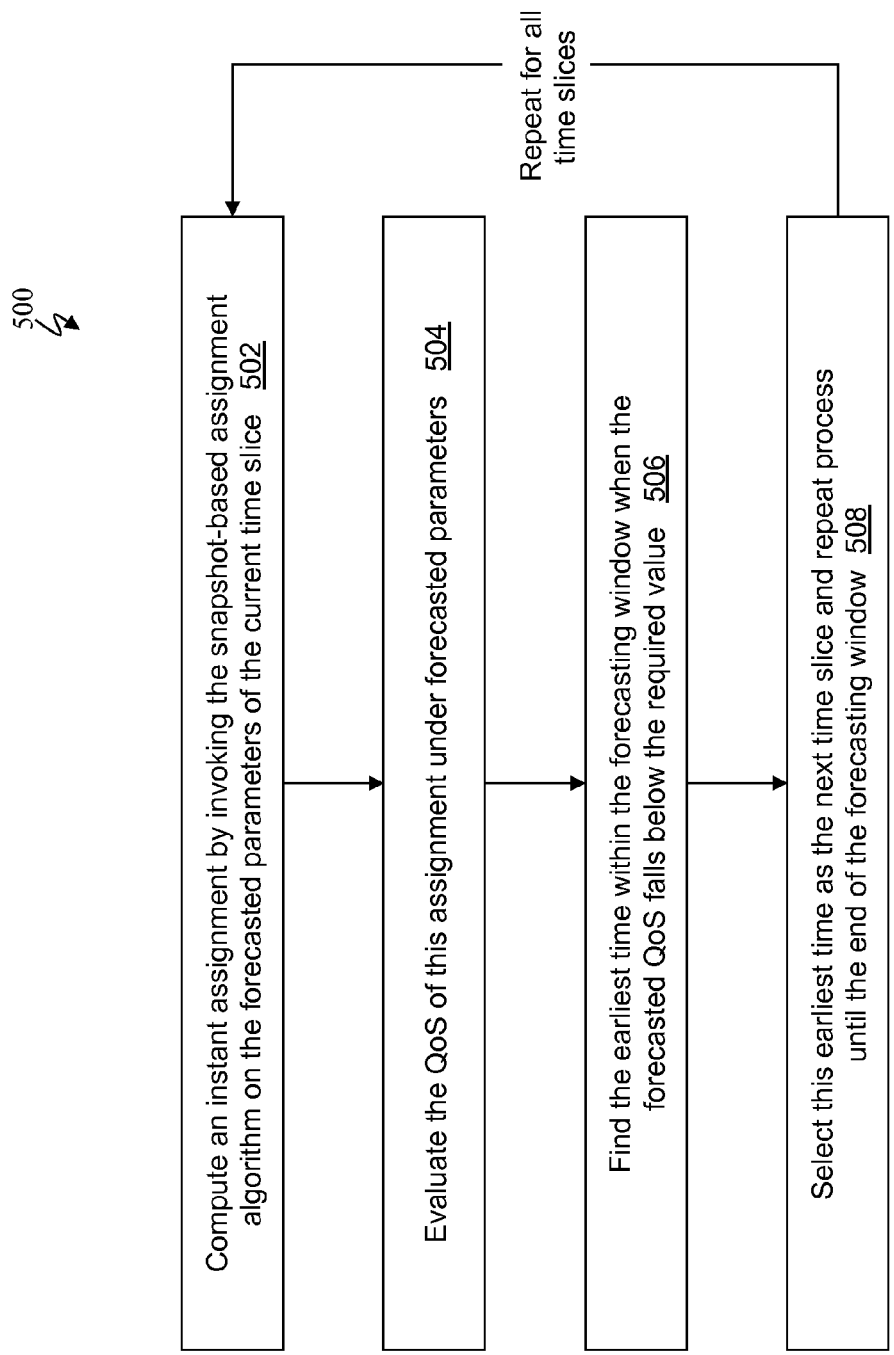
FIG. 5 illustrates a flow chart in accordance with exemplary embodiments.

In the adaptive technique, time slices may not be evenly distributed but are adaptively sampled by the forecasting-based service assignment module 70 according to certain QoS requirements. Given a required QoS, the forecasting-based service assignment module 70 is configured to perform sampling sequentially as illustrated in a process 500 in FIG. 5. The forecasting-based service assignment module 70 is configured to start from the beginning of the forecasting window T which has a first time slice and continue through a last time slice.

At operation 502, the forecasting-based service assignment module 70 is configured to compute an instant assignment (such as assignment $A(t_0)$) by executing/invoking the snapshot-based assignment algorithm on the forecasted parameters of the current time slice (e.g., the time slice $X(t_0)$). At operation 504, the forecasting-based service assignment module 70 is configured to evaluate the QoS of this assignment under forecasted parameters such as demand for instantiating virtual machines and available resources.

At operation 506, the forecasting-based service assignment module 70 is configured to find the earliest time within the forecasting time window T when the forecasted QoS falls below the required (minimum) QoS value. During the time window T, the forecasted QoS is the predicted QoS for the demand for new virtual machines to be mapped on the available resources (such as computer systems/servers 12, along with the available memory, CPUs, processor speed on those computer systems/servers 12) in the cloud environment 50. The required QoS is the quality of service agreed upon, e.g., in a service level agreement (SLA) to be met for virtual machines of, e.g., a customer.

At operation 508, the forecasting-based service assignment module 70 is configured to select this earliest time as the next time slice and repeat operations 502, 504, 506, and 508 through the end of the forecasting time window T (i.e., the last time slice in the forecasting window). For example, the forecasting-based service assignment module 70 may determine that halfway through the time window T the forecasted QoS drops below the required QoS value; accordingly, the forecasting-based service assignment module 70 selects this halfway point as the next time slice $X(t_{halfway})$ and returns to operation 502. For each cycle through the process 500, the forecasting-based service assignment module 70 can continue creating another time slice (to be the next time slice) at any point in time in which the forecasted QoS falls below the required QoS value in the time window T (in operation 506).

The process 500 ends when all the time slices are processed in the time window T.

The difference between the periodic technique and the adaptive technique is whether assignment checks are triggered periodically and/or by perceived QoS violation.

The difference between the first approach (time series aggregation) 425 and the second approach (service assignment aggregation) 430 is whether further reassignment is allowed in the forecasting window T at operation 408. If not, then the forecasting-based service assignment module 70 proceeds to optimize the average and/or worst-cast performance in one attempt under the first approach 425. Otherwise, the forecasting-based service assignment module 70 proceeds to minimize the cost once reassignment is needed under the second approach 430.

Additionally, exemplary embodiments may be configured to take into account any errors in time series forecasting. Since in general the demands/resources vary stochastically, the forecasting operation may face some uncertainty which could possibly introduce errors in the operations. To handle this issue, the procedure of forecasting-based service assignment module 70 may be modified as follows. In operation 404, the forecasting-based service assignment module 70 may be configured to provide a confidence interval instead of a precise value for each element of the forecasted time series, where the associated confidence level, specified by the user, indicates with what probability the actual time series will fall within the forecasted interval (window).

In the first approach 425 by the forecasting-based service assignment module 70, the aggregation will be performed on the worst case values on the boundaries of the confidence intervals (i.e., maximum resource demands, minimum available resources), and the performance guarantee for the resulting assignment is also relaxed probabilistically by the associated confidence level. For example, if the original guarantee is to maintain feasibility p fraction of the time during the forecasting window T, then considering the confidence level of q yields a corrected guarantee that feasibility is maintained p fraction of the forecasting window with probability at least q. In the second approach 430 by the forecasting-based service assignment module 70, the per time slice assignment may also be computed on the worst case boundary values of the forecasted time series at the sampled time instances, with a relaxed performance guarantee.

Figure 6:
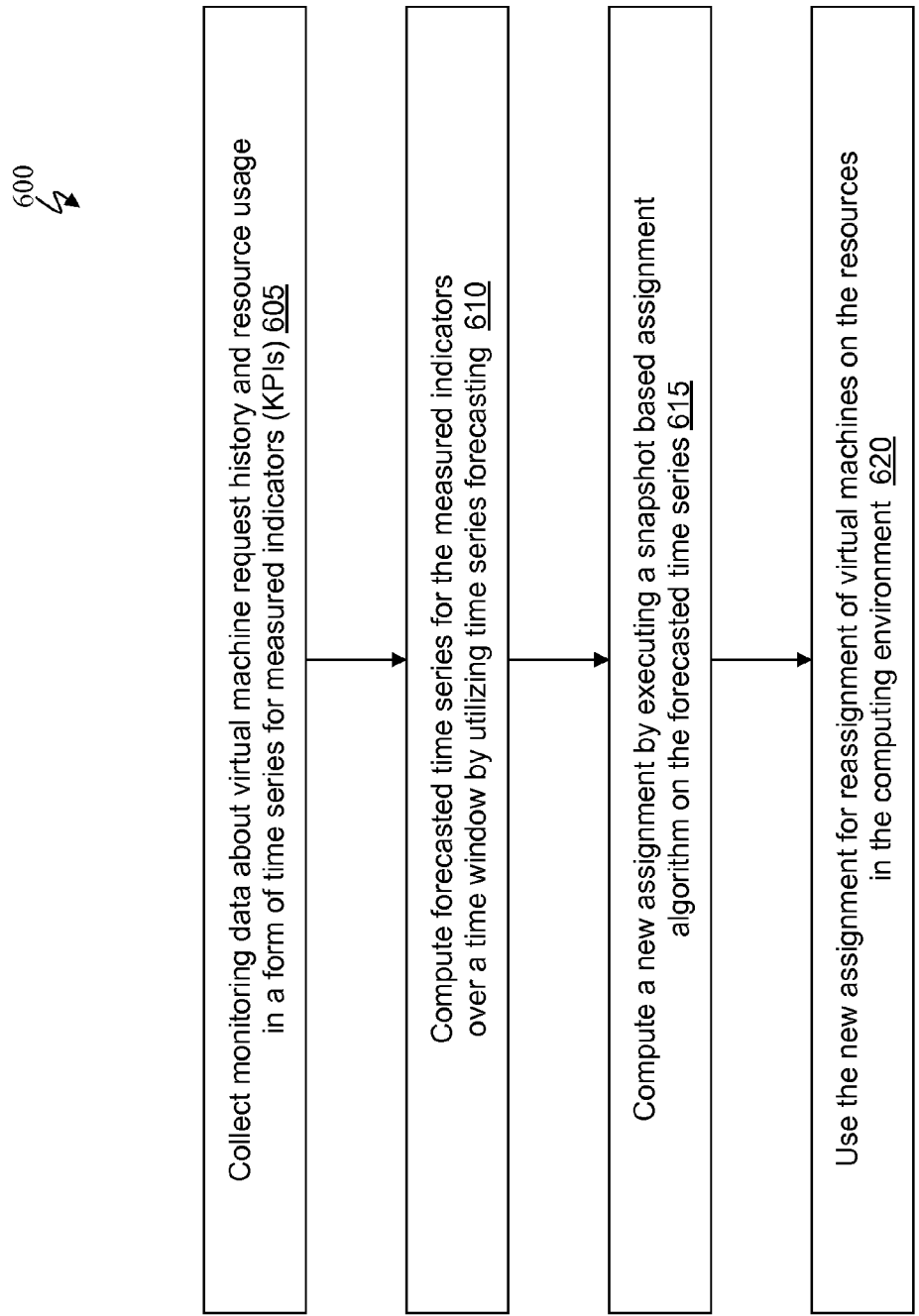
FIG. 6 illustrates a flow chart in accordance with exemplary embodiments.

FIG. 6 illustrates a method, e.g., by the forecasting-based service assignment module 70 on a computer such as the computer system/server 12 for reassigning virtual machines to resources in the computing environment 50. The forecasting-based service assignment module 70 can assign and/or reassign any virtual machine (virtual machines may include any element in the virtualization layer 62) to any element in the hardware and software layer 60 according to exemplary embodiments.

At operation 605, the forecasting-based service assignment module 70 is configured to collect monitoring data about virtual machine request history and resource usage in the form of time series data for measured indicators (key performance indicators (KPI)). Collected monitoring data (i.e., KPIs) for request history and resource usage may include but are not limited to central processing units (CPU), memory, bandwidth, disk utilization, and/or disk availability of, e.g., the computing environment 50. Collected monitoring data (i.e., KPIs) may also include any suitable measurements from the application, and/or software layers such as size of thread pools, message queue lengths, heap size, etc.

At operation 610, the forecasting-based service assignment module 70 is configured to compute forecasted time series (such as the curves of forecasted time series 704) for the measured indicators over a time window T by utilizing time series forecasting.

At operation 615, the forecasting-based service assignment module 70 is configured to compute a new assignment by executing a snapshot based assignment algorithm on the forecasted time series. This new assignment is the assignment to use during the forecasting time window T.

At operation 620, the forecasting-based service assignment module 70 is configured to use the new assignment for reassignment of virtual machines on the resources in the computing environment 50. For example, the new assignment is used to map and/or remap virtual machines to resources in the computing environment 50.

The forecasting-based service assignment module 70 is configured to determine whether the reassignment is needed by comparing a forecasted quality of service (QoS) under a current assignment (of virtual machine(s)) with a minimum required quality of service (that would be required in the future) and/or to determine whether the reassignment is needed by comparing the forecasted quality of service (QoS) under the current assignment with the forecasted quality of service (QoS) under reassignment adjusted by a forecasted reassignment cost (which is the cost of reassigning/migrating the virtual machines that are assigned differently in the reassignment compared with the current assignment). In the time window T, the forecasted QoS may be greater than, equal to, and/or less than the minimum required QoS. The forecasted quality of service may be a predicted QoS for particular virtual machines at a future time within the time window T. The minimum required quality of service may be the paid for and/or agreed upon quality of service for a customer according to a service level agreement (SLA) for the particular virtual machines. The forecasted quality of service (QoS) for a current assignment of the particular virtual machine(s) may be at a predicted QoS in the future which could be higher than, equal to, and/or lower than the minimum required quality of service in the future. The forecasted (predicted) quality of service (QoS) for the proposed reassignment of the particular virtual machine(s) may be higher than, equal to, and/or lower than the forecasted quality of service (QoS) for the current assignment of the particular virtual machine(s).

The forecasting-based service assignment module 70 is configured to compute a reassignment cost per virtual machine that is affected in time window T as a function of: computation time, virtual machine interruption time (suspend/resume), and data/code transfer time. For example, this function can be a summation. The reassignment cost per virtual machine includes the time to instantiate (copy) and migrate each of the affected virtual machines from one resource like computer system/server 12 to a different computer system/server 12 in the computing environment 50. The forecasting-based service assignment module 70 is configured to compute a total (combined) reassignment cost for all of the virtual machines as an aggregate of the cost per virtual machine (e.g., by taking the maximum) that is affected by the reassignment.

Computing the forecasted time series for the measured indicators (KPIs) over the time window T by utilizing time series forecasting may comprise the forecasting-based service assignment module 70 computing/receiving a confidence interval and computing/receiving a confidence level for each point in the forecasted time series.

Computing the forecasted time series for the measured indicators over the time window T by utilizing time series forecasting may comprise the forecasting-based service assignment module 70 replacing the forecasted time series for resource indicators of the measured indicators (KPI) with their lower bounds under a confidence level and replacing service demand indicators with their upper bounds under the confidence level of the measured indicators.

Computing the new assignment by executing the snapshot based assignment algorithm on the forecasted time series may comprise the forecasting-based service assignment module 70 aggregating each one of the forecasted time series into aggregated single values by executing an aggregation function (examples of which include percentile and mean) and the forecasting-based service assignment module 70 using the snapshot based assignment algorithm on the aggregated single values to produce a snapshot based assignment for the entire set of the forecasted time series (e.g., forecasted time series 704).

Figure 7:
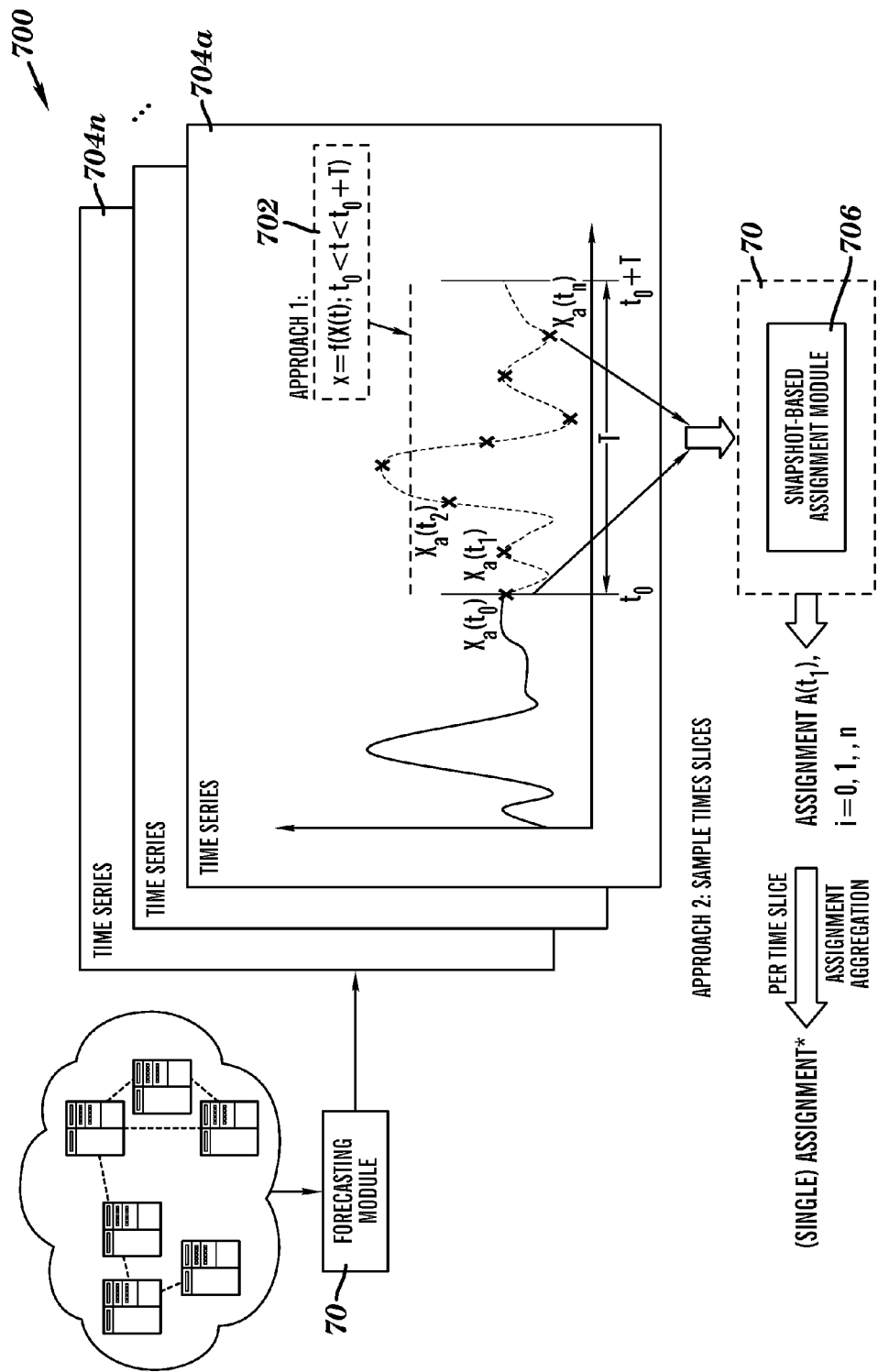
FIG. 7 illustrates a diagram in accordance with exemplary embodiments.

Computing the new assignment by executing the snapshot based assignment algorithm on the forecasted time series may comprise the forecasting-based service assignment module 70 dividing the forecasted time series into time slices (such as time slices $X(t_0)$ through $X(t_n)$), executing the snapshot based assignment algorithm on the forecasted instantaneous resource/demand values at each of the time slices to produce snapshot assignments per time slice, and aggregating the snapshot assignments per time slice into a single assignment (such as assignment* in FIG. 7).

The forecasting-based service assignment module 70 is configured to allow a user via a GUI to tune parameters of the aggregation functions to satisfy the minimum quality of service requirement under the snapshot based algorithm.

The single assignment is computed by the forecasting-based service assignment module 70 to have a minimum reassignment cost, such as, e.g., a minimum computation time, virtual machine interruption time (suspend/resume), data/code transfer time, etc.

The forecasting-based service assignment module 70 is configured to sequentially generate the time slices by repeating: sampling a time slice, computing a snapshot assignment for the sampled time slice by executing the snapshot based algorithm, and finding a next time when the forecasted quality of service of the snapshot assignment for the sampled time slice violates the required quality of service. This process repeats for each time slices as illustrated with reference to FIG. 5.

The forecasting-based service assignment module 70 is configured to compute an intermediate assignment with the minimum cost of being reassigned into any of the snapshot assignments per time slice.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method on a computer for reassigning virtual machines to hardware resources, which is from one hardware resource to a different hardware resource, in a computing environment, comprising:
collecting monitoring data about past virtual machine request history of past requests for virtual machines and past hardware resource usage in a form of time series;
computing forecasted time series for the monitoring data over a future time window by utilizing time series forecasting, wherein the future time window is a particular time interval in a future;
computing a new assignment of the virtual machines needed in the future time window based on the forecasted time series by executing a snapshot based assignment algorithm on the forecasted time series, wherein the snapshot provides current service demands for current virtual machines running on current hardware resources at a present time;
using the new assignment for reassignment of virtual machines on the hardware resources in the computing environment;
computing a future reassignment cost per virtual machine that needs to be reassigned in the future time window for the reassignment as a combination of computation time, virtual machine interruption time, data transfer time, and consumed bandwidth in the future time window;
computing a total future reassignment cost for the virtual machines that need to be reassigned in the future as an aggregate of the cost per virtual machine that is affected by the reassignment; and
based on the future reassignment cost per virtual machine that needs to be reassigned in the future time window, determining that performing the new assignment for the reassignment of the virtual machines at the present time is more cost effective than performing the reassignment of the virtual machines in the future during the future time window;
wherein computing the new assignment by executing the snapshot based assignment algorithm on the forecasted time series comprises:
aggregating each one of the forecasted time series into aggregated single values by executing an aggregation function; and
using the snapshot based assignment algorithm on the aggregated single values to produce a snapshot assignment for an entire time of the future time window; and further comprising:
tuning parameters of the aggregation function to satisfy a minimum quality of service requirement under the snapshot based algorithm.

2. The method of claim 1, further comprising at least one of:
determining whether the reassignment is needed by comparing a forecasted quality of service under a current assignment with a minimum required quality of service; and
determining whether the reassignment is needed by comparing the forecasted quality of service under the current assignment with a forecasted quality of service under the reassignment of the virtual machines.

3. The method of claim 1, wherein computing the new assignment by executing the snapshot based assignment algorithm on the forecasted time series comprises:
dividing the forecasted time series into time slices;
executing the snapshot based assignment algorithm on each of the time slices to produce snapshot assignments per time slice; and
aggregating the snapshot assignments per time slice into a single assignment.

4. The method of claim 3, wherein the single assignment is computed to have a minimum reassignment cost in being modified into one of the snapshot assignments per time slice; and
wherein the minimum reassignment cost refers to a minimum number of reassigned virtual machines required per time slice.

5. The method of claim 3, further comprising:
sequentially generating the time slices which comprises:
sampling a first time slice;
computing a snapshot assignment for the first time slice by executing the snapshot based algorithm;
finding an earliest time within the future time window when the snapshot assignment for the first time slice violates a future minimum quality of service in the future time window;
use the earliest time as a next time slice to: compute a second snapshot assignment for the next time slice by executing the snapshot based algorithm, and find a next earliest time within the future time window when the second snapshot assignment for the next time slice violates the future minimum quality of service in the future time window.

6. A computer program product for reassigning virtual machines to hardware resources, which is from one hardware resource to a different hardware resource, in a computing environment, the computer program product comprising:
a non-transitory computer readable storage medium having computer readable program code embodied therewith, the computer readable program code comprising:
collecting monitoring data about past virtual machine request history of past requests for virtual machines and past hardware resource usage in a form of time series;
computing forecasted time series for the monitoring data over a future time window by utilizing time series forecasting, wherein the future time window is a particular time interval in a future;
computing a new assignment of the virtual machines needed in the future time window based on the forecasted time series by executing a snapshot based assignment algorithm on the forecasted time series, wherein the snapshot provides current service demands for current virtual machines running on current hardware resources at a present time;
using the new assignment for reassignment of virtual machines on the hardware resources in the computing environment;
computing a future reassignment cost per virtual machine that needs to be reassigned in the future time window for the reassignment as a combination of computation time, virtual machine interruption time, data transfer time, and consumed bandwidth in the future time window;
computing a total future reassignment cost for the virtual machines that need to be reassigned in the future as an aggregate of the cost per virtual machine that is affected by the reassignment; and
based on the future reassignment cost per virtual machine that needs to be reassigned in the future time window, determining that performing the new assignment for the reassignment of the virtual machines at the present time is more cost effective than performing the reassignment of the virtual machines in the future during the future time window;

wherein computing the new assignment by executing the snapshot based assignment algorithm on the forecasted time series comprises:

aggregating each one of the forecasted time series into aggregated single values by executing an aggregation function; and using the snapshot based assignment algorithm on the aggregated single values to produce a snapshot assignment for an entire time of the future time window; and further comprising:

tuning parameters of the aggregation function to satisfy a minimum quality of service requirement under the snapshot based algorithm.

7. The product of claim 6, further comprising at least one of:

determining whether the reassignment is needed by comparing a forecasted quality of service under a current assignment with a minimum required quality of service; and determining whether the reassignment is needed by comparing the forecasted quality of service under the current assignment with a forecasted quality of service under the reassignment of the virtual.

8. The product of claim 6, wherein computing the new assignment by executing the snapshot based assignment algorithm on the forecasted time series comprises:

dividing the forecasted time series into time slices;

executing the snapshot based assignment algorithm on each of the time slices to produce snapshot assignments per time slice; and aggregating the snapshot assignments per time slice into a single assignment.

9. The product of claim 8, wherein the single assignment is computed to have a minimum reassignment cost in being modified into one of the snapshot assignments per time slice; and wherein the minimum reassignment cost refers to a minimum number of reassigned virtual machines per time slice.

10. The product of claim 8, further comprising:

sequentially generating the time slices which comprises:
sampling a first time slice;
computing a snapshot assignment for the first time slice by executing the snapshot based algorithm; and
finding an earliest time within the future time window when the snapshot assignment for the first time slice violates a future minimum quality of service in the future time window;
use the earliest time as a next time slice to: compute a second snapshot assignment for the next time slice by executing the snapshot based algorithm, and find a next earliest time within the future time window when the second snapshot assignment for the next time slice violates the future minimum quality of service in the future time window.

11. The product of claim 8, further comprising computing an intermediate assignment with the minimum cost of being reassigned.

12. An apparatus for reassigning virtual machines to hardware resources, which is from one hardware resource to a different hardware resource, in a computing environment, comprising:

memory for storing a program; and a processor, functionally coupled to the memory, the processor being responsive to computer-executable instructions contained in the program and operative for:

collecting monitoring data about past virtual machine request history of past requests for virtual machines and past hardware resource usage in a form of time series;

computing forecasted time series for the monitoring data over a future time window by utilizing time series forecasting, wherein the future time window is a particular time interval in a future;

computing a new assignment of the virtual machines needed in the future time window based on the forecasted time series by executing a snapshot based assignment algorithm on the forecasted time series, wherein the snapshot provides current service demands for current virtual machines running on current hardware resources at a present time;

using the new assignment for reassignment of virtual machines on the hardware resources in the computing environment;

computing a future reassignment cost per virtual machine that needs to be reassigned in the future time window for the reassignment as a combination of computation time, virtual machine interruption time, data transfer time, and consumed bandwidth in the future time window;

computing a total future reassignment cost for the virtual machines that need to be reassigned in the future as an aggregate of the cost per virtual machine that is affected by the reassignment; and based on the future reassignment cost per virtual machine that needs to be reassigned in the future time window, determining that performing the new assignment for the reassignment of the virtual machines at the present time is more cost effective than performing the reassignment of the virtual machines in the future during the future time window;

wherein computing the new assignment by executing the snapshot based assignment algorithm on the forecasted time series comprises:

aggregating each one of the forecasted time series into aggregated single values by executing an aggregation function; and using the snapshot based assignment algorithm on the aggregated single values to produce a snapshot assignment for an entire time of the future time window; and further comprising:

tuning parameters of the aggregation function to satisfy a minimum quality of service requirement under the snapshot based algorithm.

* * * * *